United States Patent
Ida

(10) Patent No.: US 8,402,039 B2
(45) Date of Patent: Mar. 19, 2013

(54) INFORMATION PROCESSING APPARATUS AND COMPUTER READABLE MEDIUM HAVING INFORMATION PROCESSING PROGRAM

(75) Inventor: Takayasu Ida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 170 days.

(21) Appl. No.: 12/704,861

(22) Filed: Feb. 12, 2010

(65) Prior Publication Data

US 2010/0205188 A1 Aug. 12, 2010

(30) Foreign Application Priority Data

Feb. 12, 2009 (JP) ................................. 2009-030531

(51) Int. Cl.
 *G06F 17/30* (2006.01)
(52) U.S. Cl. .................... 707/756; 707/758; 707/781
(58) Field of Classification Search .................. 707/634, 707/636, 640, 654, 709, 712, 736, 756, 758, 707/781, 999.002, 999.101, 999.102, 999.107, 707/783
 See application file for complete search history.

(56) References Cited

U.S. PATENT DOCUMENTS

| | | | |
|---|---|---|---|
| 4,588,991 A * | 5/1986 | Atalla | 713/165 |
| 4,803,651 A * | 2/1989 | Galkowski | 703/27 |
| 5,584,022 A | 12/1996 | Kikuchi et al. | |
| 5,774,666 A * | 6/1998 | Portuesi | 725/110 |
| 6,023,506 A * | 2/2000 | Ote et al. | 713/165 |
| 6,378,071 B1 * | 4/2002 | Sasaki et al. | 713/165 |
| 6,931,549 B1 * | 8/2005 | Ananda | 726/26 |
| 7,188,086 B2 * | 3/2007 | Shinzaki et al. | 705/51 |
| 7,324,974 B1 * | 1/2008 | Cho et al. | 705/51 |
| 7,370,198 B2 * | 5/2008 | Lee et al. | 713/165 |
| 7,373,517 B1 * | 5/2008 | Riggins | 713/184 |
| 7,602,939 B2 * | 10/2009 | Koshi et al. | 382/100 |

(Continued)

FOREIGN PATENT DOCUMENTS

| | | |
|---|---|---|
| JP | H06-175905 A | 6/1994 |
| JP | H09-204330 A | 8/1997 |

(Continued)

OTHER PUBLICATIONS

Japan Patent Office, Notification of Reason for Refusal for Japanese Patent Application No. 2006-030531 (counterpart Japanese patent application), dispatched Dec. 11, 2012.

*Primary Examiner* — John E Breene
*Assistant Examiner* — Evan Aspinwall
(74) *Attorney, Agent, or Firm* — Baker Botts L.L.P.

(57) ABSTRACT

An information processing apparatus includes: an encoder configured to encode target information using encoding information so as to generate encoded target information; a first storage unit configured to store a target information group including the encoded target information. The information processing apparatus further includes: an input unit configured to receive an input of the encoding information; a processing control unit configured to allow browsing of attribute information of the target information group only when the encoding information is input; a decoder configured to decode, after the browsing of the attribute information is allowed, the encoded target information using the input encoding information, so as to generate the target information; a second storage unit configured to store the target information as the target information contained in the target information group; and a processing unit configured to process the target information stored in the second storage unit as the target.

5 Claims, 8 Drawing Sheets

U.S. PATENT DOCUMENTS

| | | | |
|---|---|---|---|
| 7,877,602 B2 * | 1/2011 | French et al. | 713/163 |
| 7,908,476 B2 * | 3/2011 | Kandasamy et al. | 713/164 |
| 2003/0184589 A1 * | 10/2003 | Yamada et al. | 345/781 |
| 2005/0102508 A1 * | 5/2005 | Kim | 713/165 |
| 2008/0034223 A1 * | 2/2008 | Funahashi | 713/193 |
| 2009/0019543 A1 * | 1/2009 | Hepworth et al. | 726/21 |
| 2009/0164779 A1 * | 6/2009 | Yan et al. | 713/165 |
| 2010/0161977 A1 * | 6/2010 | Taylor | 713/165 |

FOREIGN PATENT DOCUMENTS

| | | |
|---|---|---|
| JP | 2001-051987 A | 2/2001 |

* cited by examiner

INFORMATION PROCESSING APPARATUS AND COMPUTER READABLE MEDIUM HAVING INFORMATION PROCESSING PROGRAM

CROSS-REFERENCE TO RELATED APPLICATIONS

This application claims priority from Japanese Patent Application No. 2009-030531 filed on Feb. 12, 2009, the entire contents of which are incorporated herein by reference.

TECHNICAL FIELD

The present invention relates to an information processing apparatus and an information processing program, and more particularly, to an information processing apparatus which processes information requiring encoding to improve confidentiality and an information processing program for use in the information processing apparatus.

BACKGROUND

Recently, there is growing use of information, such as personal information, online bank transactions or the like, for which there is a strong requirement for improved confidentiality with regard to strangers or external parties, on an information processing apparatus such as a personal computer.

When information as described above is used, generally, a "password" dedicated for the use of the information is personally set, and then processes, such as browsing of a folder including the information on a recording medium or decoding of a file representing the information, can be performed only when collation with the password is obtained.

In the related art, an encoding or decoding process is independently performed for every file or folder. In this case, when performing the encoding or decoding process, password input corresponding to each process is required for each file or folder on a case-by-case basis.

SUMMARY

However, the files or folders are generally recorded in a hierarchical structure for the sake of convenience. Further, in the encoding or decoding process, since the password input is required to be performed for each file or the like on a case-by-case basis, a user is required to make a laborious effort to perform each process, thereby remarkably reducing user convenience.

The present invention was made in view of the above circumstances, and an object of some aspects of the invention is to provide an information processing apparatus and an information processing program for use in the information processing apparatus which are capable of remarkably improving user convenience of a file or the like, even in the case that the file or the like is recorded in a hierarchical structure with a plurality of layers.

According to an aspect of the invention, there is provided an information processing apparatus comprising: an encoder configured to encode target information which is a target to be processed using encoding information so as to generate encoded target information; a first storage unit configured to store a target information group which includes the generated encoded target information; an input unit configured to receive an input of the encoding information; a processing control unit configured to allow browsing of attribute information indicating an attribute of the target information group only when the encoding information is input; a decoder configured to decode, after the browsing of the attribute information is allowed, the encoded target information contained in an encoded target information group of which the attribute information is allowed to be browsed, using the input encoding information, so as to generate the target information; a second storage unit configured to store the generated target information as the target information contained in the target information group; and a processing unit configured to process the target information stored in the second storage unit as the target.

According to another aspect of the invention, there is provided a computer readable medium having an information processing program for an information processing apparatus comprising an input unit, a first storage unit and a second storage unit, said program being stored thereon, readable by a computer, and when executed by the computer, causing the computer to perform operations comprising: encoding target information which is a target to be processed using encoding information so as to generate encoded target information; storing a target information group containing the generated encoded target information in the first storage unit; allowing browsing of attribute information indicating an attribute of the target information group only when the encoding information is input from the input unit; decoding, after the browsing of the attribute information is allowed, the encoded target information contained in an encoded target information group of which the attribute information is allowed to be browsed, using the input encoding information, so as to generate the target information; storing the generated target information as the target information contained in the target information group into the second storage unit; and processing the target information stored in the second storage unit as the target.

BRIEF DESCRIPTION OF DRAWINGS

FIGS. 1A and 1B are block diagrams illustrating schematic configurations of an information processing system according to an embodiment of the invention, in which FIG. 1A is a block diagram illustrating an overall configuration of the information processing system; and FIG. 1B is a block diagram illustrating a configuration of a personal computer included in the information processing system;

FIGS. 2A and 2B are flowcharts (I) illustrating a process according to the embodiment, in which FIG. 2A is a flowchart illustrating a browsing process (I) for a secure folder according to the embodiment; and FIG. 2B is a flowchart illustrating a password authentication/decoding process according to the embodiment;

FIGS. 3A and 3B are display screen examples (I) in the browsing process for the secure folder according to the embodiment, in which FIG. 3A is an exemplary view of an initial screen; and FIG. 3B is an exemplary view of a password authentication screen;

FIGS. 4A and 4B are display screen examples (II) in the browsing process for the secure folder according to the embodiment, in which FIG. 4A is an exemplary view of a property display screen; and FIG. 4B is an exemplary view of a preview screen;

FIGS. 5A to 5D are flowcharts (II) illustrating processes according to the embodiment, in which FIG. 5A is a flowchart illustrating a browsing process (II) for the secure folder according to the embodiment; FIG. 5B is a flowchart illustrating a pasting process to the secure folder according to the embodiment; FIG. 5C is a flowchart illustrating an import process to the secure folder according to the embodiment; and FIG. 5D is a flowchart illustrating a registering process to the secure folder according to the embodiment; and FIGS. 6A to 6D are flowcharts (III) illustrating processes according to the embodiment, in which FIG. 6A is a flowchart illustrating details of the pasting process to the secure folder according to the embodiment; FIG. 6B is a flowchart illustrating the pasting process from the secure folder according to the embodiment; FIG. 6C is a flowchart illustrating details of the import process to the secure folder according to the embodiment; and FIG. 6D is a flowchart illustrating details of the registering process to the secure folder according to the embodiment.

DESCRIPTION

Embodiments of the invention will be described hereinafter with reference to the accompanying drawings, in which the invention is applied to an information processing system which includes a personal computer as an information processing apparatus and a display apparatus using, for example, an electrophoretic method which is connected to the personal computer. However, the present invention should not be construed as being limited thereto.

Firstly, a schematic configuration of the information processing system according to the embodiment will be described with reference to FIG. 1A.

Figure 1A:
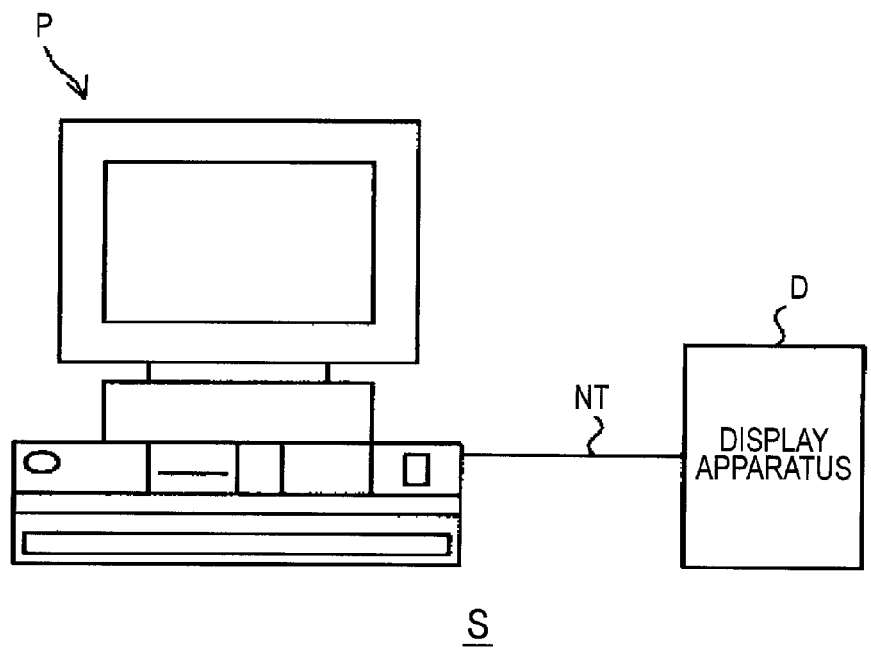

As shown in FIG. 1A, an information processing system S according to the embodiment includes a personal computer P and a display apparatus D, which are connected to each other through a network NT, for example, according to a USB (Universal Serial Bus) standard or a LAN (Local Region Network) standard. Data communication between the personal computer P and the display apparatus D may be performed using a memory card (not shown).

In this configuration, information which is decoded by a process to be described later in the personal computer P is output to the display apparatus D through the network NT to be displayed on the display apparatus D.

Next, a configuration and an operation of the personal computer P according to the embodiment will be schematically described with reference to FIG. 1B.

Figure 1B:
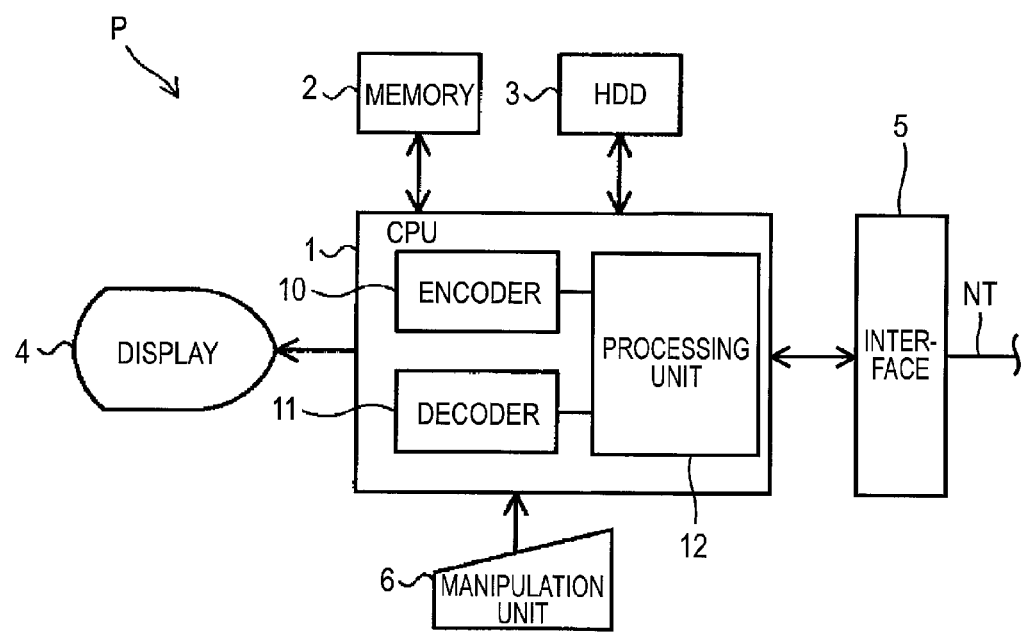

As shown in FIG. 1B, the personal computer P according to the embodiment includes a CPU 1, a memory 2, an HDD (Hard Disk Drive) 3, a display 4, a manipulation unit 6 and an interface 5. The CPU 1 has the functions of an encoder 10 which is an example of an encoding unit, a decoder 11 which is an example of a decoding unit and a processing unit 12 which is an example of a processing control unit, a processing unit and a deleting unit. The memory 2 is an example of a second storage unit and which is provided as a volatile RAM (Random Access Memory) or the like. The HDD 3 is an example of a first storage unit in which a non-volatile hard disk is installed. The display 4 is a liquid crystal display or the like. The manipulation unit 6 is an example of an input unit and which has a mouse, a keyboard or the like. The interface 5 performs information communication between the display apparatus D and the personal computer P through the network NT.

In such a configuration, a variety of files, which includes files whose contents are to be displayed on the display apparatus D and which have a so-called hierarchical folder structure, are recorded in the HDD 3 in a non-volatile manner. Herein, according to the embodiment, the folder having the corresponding hierarchical folder structure includes a normal folder and a secure folder. The normal folder refers to a folder where processing is able to be freely performed on files included in the folder. To the contrary, the secure folder refers to a folder in which an authentication process using a given password as an example of encoding information is required for a process for opening and closing (browsing) the secure folder and a file included in the secure folder. The encoding information is not limited to the password, and may be any information used for authentication. In the secure folder according to the embodiment, other folders and files are recorded (stored) in a lower position in the hierarchical structure, but browsing of the folder having the lower hierarchical structure and processing of the file in the folder are not allowed unless the authentication process using the password which is used for browsing of the secure folder itself is performed.

Meanwhile, the encoder 10 and the decoder 11 in the CPU 1 respectively perform an encoding process and a decoding process according to the embodiment for the file in the secure folder under the control of the processing unit 12. These processes will be described in more detail later. In addition, the processing unit 12 mainly performs a process which is required for the personal computer P based on a manipulation signal from the manipulation unit 6 to be described later.

Further, in the memory 2, data which is required for the processes in the personal computer P including the encoding process and the decoding process is temporarily recorded and read out as necessary. In addition, a command of a user for the personal computer P is performed by a command manipulation in the manipulation unit 6, and then, the CPU 1 operates based on a manipulation signal from the manipulation unit 6 corresponding to the instruction manipulation. Further, information which is required for the encoding process or the like is displayed on the display 4 under the control of the CPU 1. Moreover, a required input/output process is performed by the interface 5 for the data communicated between the personal computer P and the display apparatus D.

Next, the encoding process and the like for the secure folder in the personal computer P according to the embodiment will be specifically described with reference to FIGS. 2 to 6.

(I) Embodiment of Browsing Process of Secure Folder

Firstly, a process when browsing a folder, a file or the like, which is stored in the secure folder by manipulating an icon of the secure folder which is displayed on a display 4, will be described with reference to FIGS. 2 to 4.

Figure 2A:
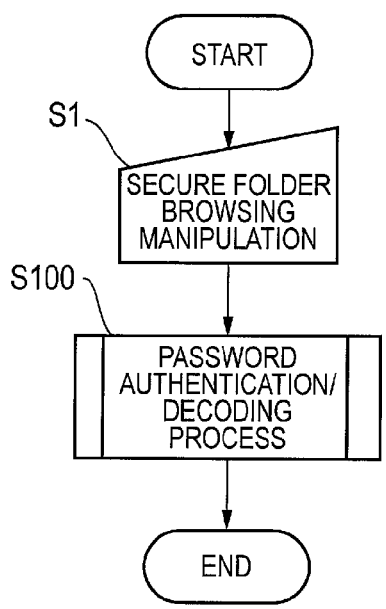
Figure 3A:
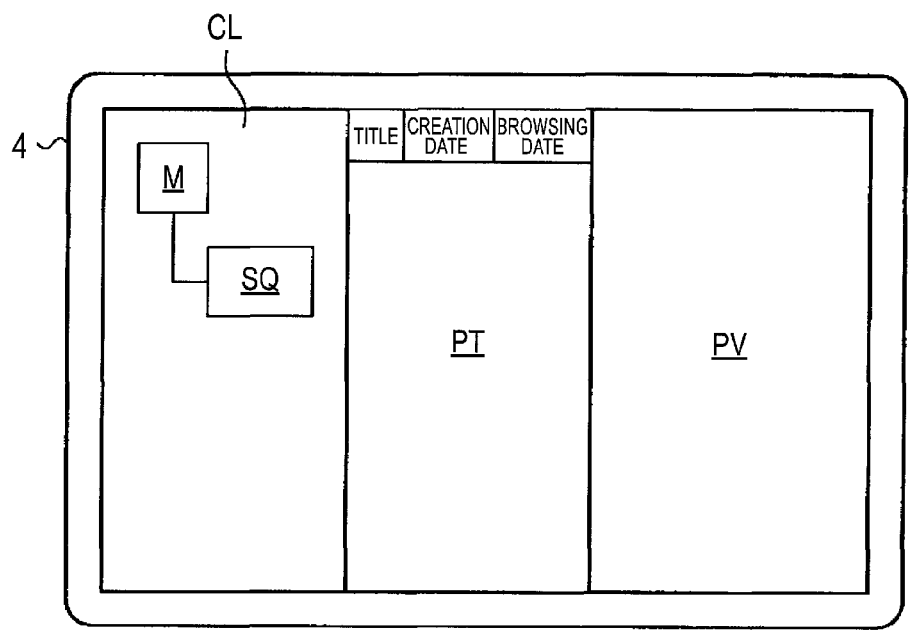

When the browsing process is performed according to the embodiment shown in FIG. 2A, for example, a screen exemplified in FIG. 3A is displayed on the display 4. The screen includes a hierarchical structure display region CL, a property display region PT and a preview display region PV.

Herein, in the hierarchical structure display region CL is displayed a hierarchical structure for the secure folder according to the embodiment. In FIG. 3A, a secure folder SQ and a main folder M in which the secure folder SQ is included are displayed in the hierarchical structure display region CL. In this respect, strictly speaking, the secure folder SQ and the main folder M which are exemplified in FIG. 3A are "icons" indicating the secure folder and the main folder. However, for simplicity of description hereinafter, the icons are respectively referred to as the secure folder SQ and the main folder M.

Further, the property display region PT is a region in which so-called properties (properties which indicates attributes of the file such as a file name, creation date and time, browsing date and time or the like) which are attribute information for a file which belongs to a folder selected at that time in the hierarchical structure display region CL. In addition, the preview display region PV is a region in which a so-called preview screen is displayed for browsing in advance contents of a file or data which is selected at that time in the property display region PT.

Figure 3B:
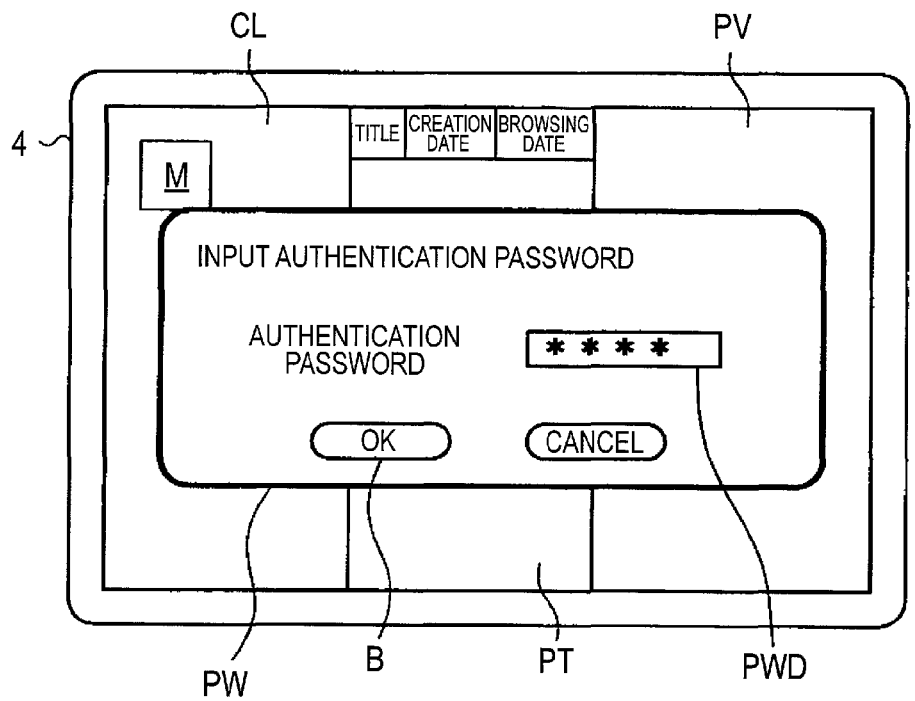

In a state where the screen exemplified in FIG. 3A is displayed, if a manipulation for selecting and browsing the secure folder SQ using a so-called menu screen (not shown) is performed in the manipulation unit 6 (step S1), the processing unit 12 of the CPU 1 which receives a manipulation signal thereof performs the password authentication/decoding process according to the embodiment and the details of which are shown in FIG. 3B (step S100). Then, the browsing process of the secure folder SQ according to the embodiment is terminated.

Figure 2B:
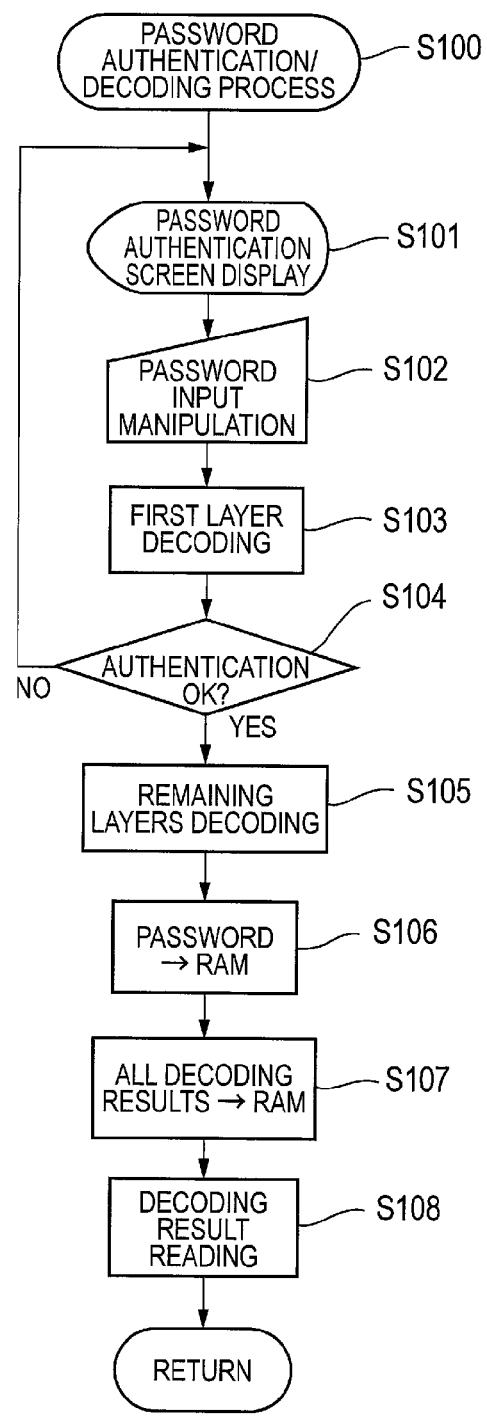

Next, details for the password authentication/decoding process in step S100 will be described with reference to FIGS. 2B to 4, in which FIG. 2B is a flowchart illustrating details of the password authentication/decoding process.

As shown in FIG. 2B, if the selection manipulation according to step S1 is performed for the secure folder SQ exemplified in FIG. 3A, as the process of step S100, the processing unit 12 firstly displays a password authentication screen PW exemplified in FIG. 3B on the display 4 (step S101). The password authentication screen PW includes at least a password input unit PWD to which a password for the browsing of the secure folder SQ and the process for the files included in the secure folder SQ is input, and an OK button B for performing a manipulation indicating completion of the password input.

In the state where the password authentication screen PW is displayed, if a password is input to the password input unit PWD using the manipulation unit 6 (step S102), a decoder 11 performs an operation for opening the secure folder SQ; a process for displaying properties corresponding to a folder and a file which belong to a first layer in the secure folder SQ; and a process for decoding the corresponding folder and file, using the input password (step S103). At this time, the encoded data which becomes the target for the decoding process is not deleted after the decoding process and remains on an HDD 3 as it is.

It is confirmed in the processing unit 12 whether the decoding process in step S103 has been performed without any problems (step S104). If the decoding process in step S103 is not performed due to a difference between contents of two passwords as a result of the confirmation (step S104; NO), the processing unit 12 recognizes the password authentication as a failure and returns the procedure to step S101 to display a screen for requiring an input of a new password on the display 4.

In this respect, as a result of the confirmation in step S104, if the decoding process in step S103 has been performed without any problems (step S104; YES), a content of the password input in step S102 and a content of a password which has been set for authentication at that time are the same, and thus, it is determined that the authentication is allowed. Thus, the decoder 11 performs in a lump the decoding process, using the password input in step S102, for all folders and files which belong to a second layer and all layers below the second layer in the secure folder SQ (step S105). In the decoding process in step S105, the encoded data which becomes the target of the decoding process is not deleted after the decoding process, and remains on the HDD 3 as it is.

After the decoding process in step S105 is terminated, the processing unit 12 stores both the password which is input in step S102 and provided for processing step S103 and S105 and all the decoded data which is obtained as a result of step S105, in the memory 2 (steps S106 and S107). Then, the processing unit 12 reads the decoded data stored in the memory 2 which is to be provided to the display process or the like on the display 4 (step S108), and then, the password authentication/decoding process as step S100 is terminated.

Figure 4A:
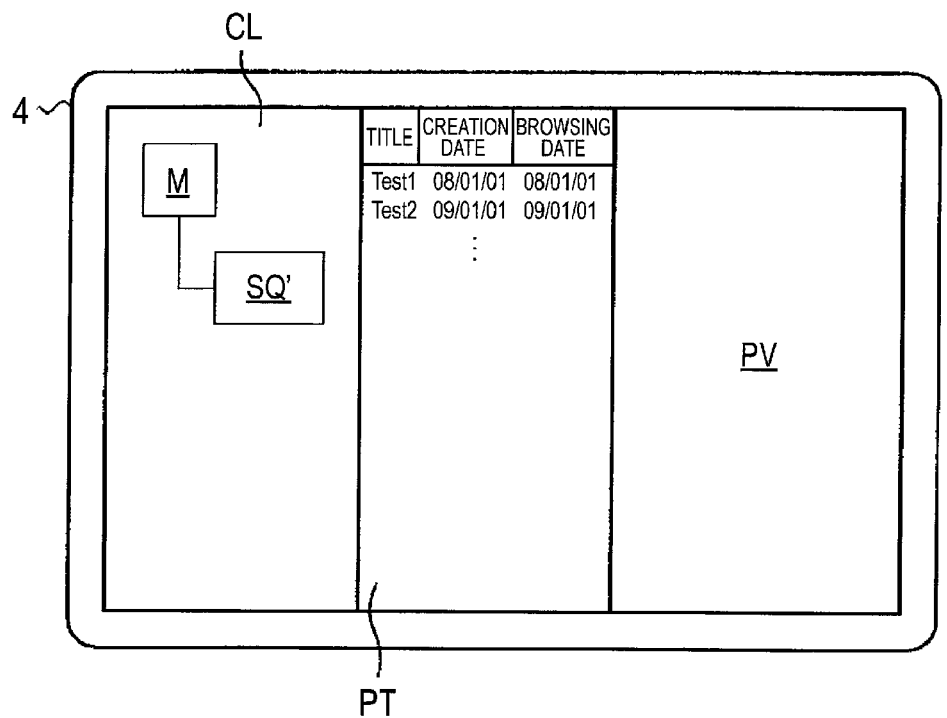
Figure 4B:
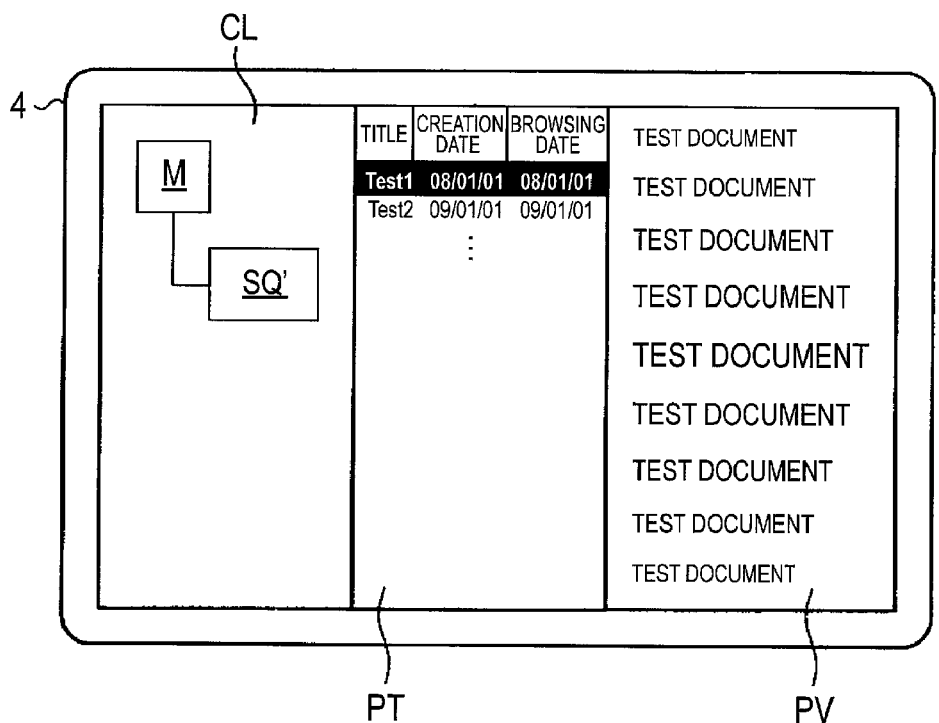

Herein, when the processes up to step S108 are terminated, as shown in FIG. 4A, a display state of the secure folder SQ which is displayed in the hierarchical structure display region CL is changed into a secure folder SQ' which represents "able to be accessed". Further, properties of all the folders or files which belong to the secure folder SQ are displayed by the number of the corresponding folders or files in the property display region PT. In this state, if any one of the files or data whose properties are displayed in the property display region PT (in the case of FIG. 4, a file having the name of "Tes1") is selected in the manipulation unit 6, as shown in FIG. 4B, a preview screen corresponding to contents of the file or data is displayed in the preview display region PV.

Next, processes of the secure folder SQ, which are performed in the personal computer P according to the embodiment, other than the browsing process of the secure folder SQ described with reference to FIGS. 2 to 4, will be specifically described with reference to FIGS. 5 and 6.

(II) Another Embodiment of Browsing Process of Secure Folder

Figure 5B:
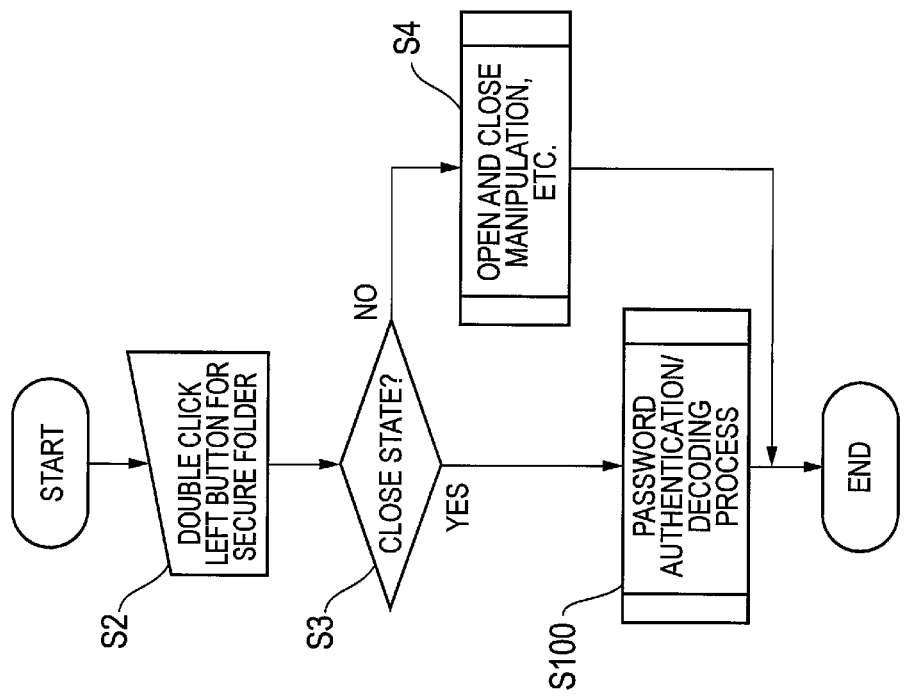
Figure 5A:
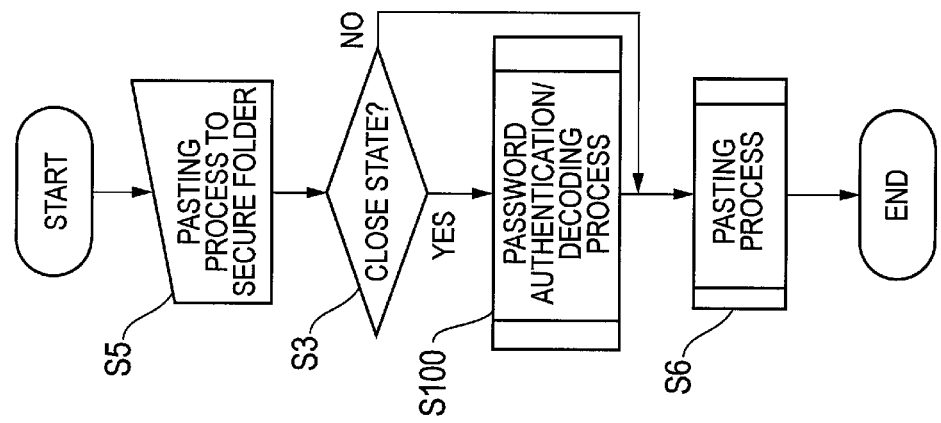

Firstly, as an another example of the browsing process of the secure folder SQ which is described with reference to FIGS. 2 to 4, a process in the case that the secure folder SQ which is displayed on the display 4 in a state exemplified in FIG. 3A is double-clicked will be described with reference to FIG. 5A. In FIG. 5A, the same processes as the processes described with reference to FIG. 2 will be given with the same step numbers, and thus, detailed description thereof will be omitted.

As shown in FIG. 5A, in the case that the secure folder SQ which is displayed on the display 4 in the state exemplified in FIG. 3A is double-clicked (step S2), the processing unit 12 confirms whether the secure folder SQ at that time is in a close state or an open state (step S3).

In this respect, the "close state" represents a state in which the password authentication/decoding process exemplified in FIG. 2 has not been performed for the secure folder SQ and thus the secure folder SQ is not allowed to be browsed. To the contrary, the "open state" represents a state in which the password authentication/decoding process exemplified in FIG. 2 has already been performed for the secure folder SQ and thus the secure folder SQ and the folders or the like which belong to the secure folder SQ are allowed to be processed.

As a result of the confirmation in step S3, if the secure folder SQ is in the open state (step S3; NO), this means authentication that the same process as for a normal folder for the secure folder SQ is to be performed, and thus, the processing unit 12 performs the process for the secure folder SQ based on the manipulation or the like in the manipulation unit 6 (step S4), and then, the process shown in FIG. 5A is terminated.

Meanwhile, as a result of the confirmation result in step S3, if the secure folder SQ is in the close state (step S3; YES), this means that the password authentication/decoding process for the secure folder SQ has not been performed, and thus, the processing unit 12 performs the password authentication/decoding process based on the manipulation or the like in the manipulation unit 6 (step S100, see FIGS. 2 to 4), and then, the process shown in FIG. 5A is terminated.

(III) Embodiment of Pasting Process to Secure Folder

Next, the case that folders or files which are included in other normal folders (hereinafter, referred to as a folder or the like) are copied, that is, a so-called pasting process is performed, for the secure folder SQ which is displayed on the display 4 in the state exemplified in FIG. 3A, will be described with reference to FIGS. 5B and 6A. In FIG. 5B, the same processes as the processes described in the FIG. 2 or FIG. 5A will be given the same step numbers, and thus, detailed description thereof will be omitted.

As shown in FIG. 5B, in the case that a manipulation for pasting a folder or the like (one example of an move operation), which is included in the other normal folders for the secure folder SQ which is displayed on the display 4 in the state exemplified in FIG. 3A, is performed in the manipulation unit 6 (step S5), the processing unit 12 confirms whether the secure folder SQ at that time is in the close state or the open state (step S3).

As a result of the confirmation in step S3, if the secure folder SQ is in the open state (step S3; NO), the processing unit 12 performs the pasting process to be described later (step S6), and then, the process shown in FIG. 5B is terminated.

Meanwhile, as a result of the confirmation in step S3, if the secure folder SQ is in the close state (step S3; YES), the processing unit 12 performs the password authentication/decoding process based on the manipulation or the like in the manipulation unit 6 (step S100, see FIGS. 2 to 4), and then, the procedure goes to an operation of step S6.

Next, the pasting process in step S6 will be specifically described with reference to FIG. 6A.

Figure 6A:
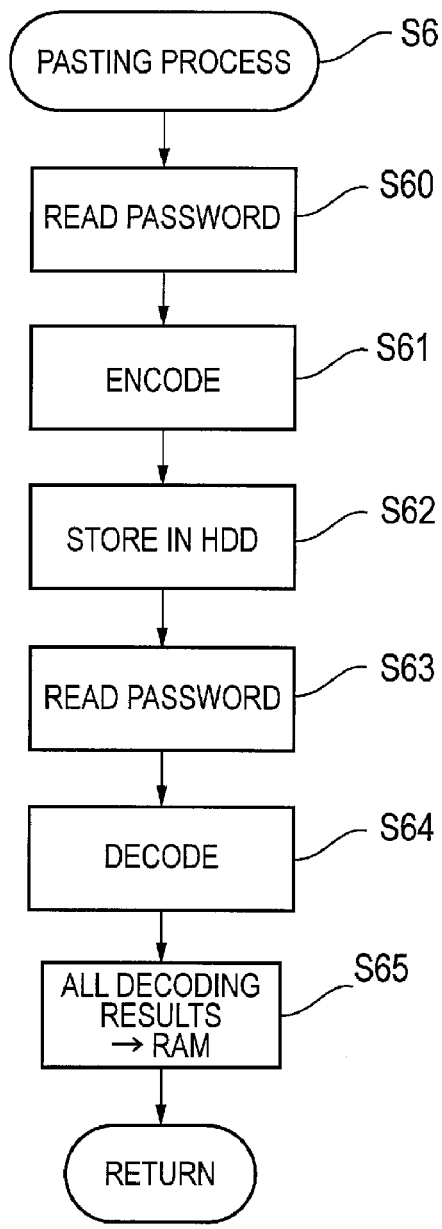

Specifically, as shown in FIG. 6A, as the pasting process, the encoder 10 firstly reads a password stored in the memory 2 at that time from the memory 2 (see step S106 in FIG. 2B) (step S60). Thus, the encoder 10 encodes a folder or the like which is a target of the pasting process using the read password (step S61), and then records the result in the HDD 3 (step S62). Then, the decoder 11 again reads the corresponding password from the memory 2 (step S63), and decodes the corresponding folder or the like recorded in the HDD 3 after the encoding (see step S61) (step S64), and stores all the decoding results in the memory 2 (step S65), and then, the procedure goes to the process shown in FIG. 5B.

Figure 6B:
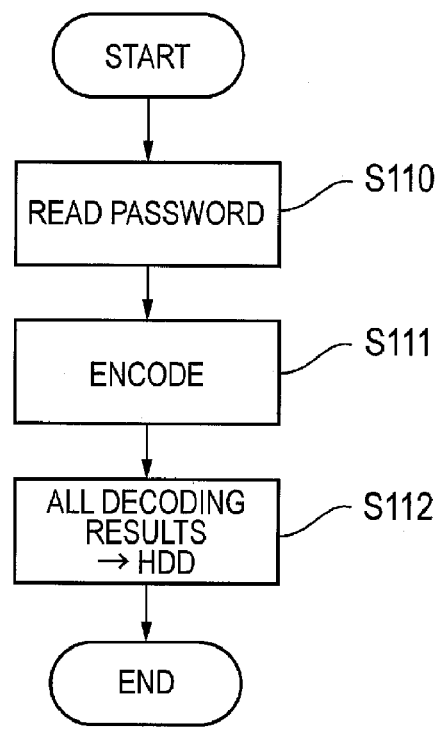

In the pasting process shown in FIG. 5B, the folder or the like in the normal folder is pasted in the secure folder SQ, but contrarily, in the case that the folder or the like in the secure folder SQ is pasted in the normal folder, differently from the case shown in FIG. 5B, it is not necessary to perform the encoding process using the password. Accordingly, in this case, as shown in FIG. 6B, the decoder 11 reads the password which is recorded in the memory 2 at that time from the corresponding memory 2 (step S110), decodes the folder or the like which is a target of the pasting process to the normal folder, using the read password (step S111), records the folder or the like after the corresponding decoding in the HDD 3 as the folder or the like which is included in the normal folder (step S112). At this time, the originally encoded folder or the like which is the target of the pasting process to the normal folder is deleted from the HDD 3.

(IV) Embodiment of Import Process to Secure Folder

Figure 5D:
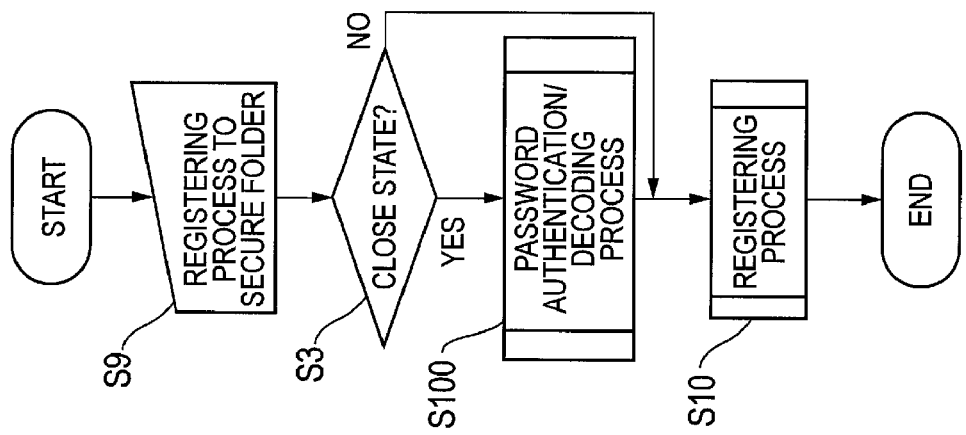
Figure 5C:
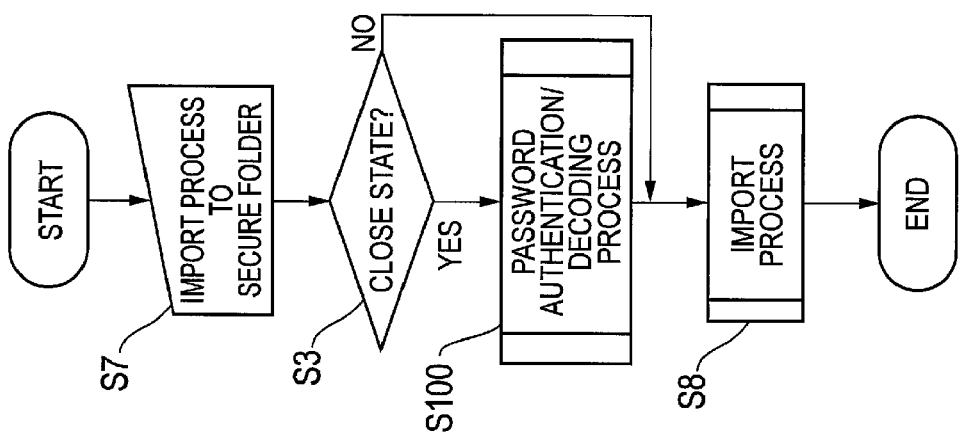
Figure 6C:
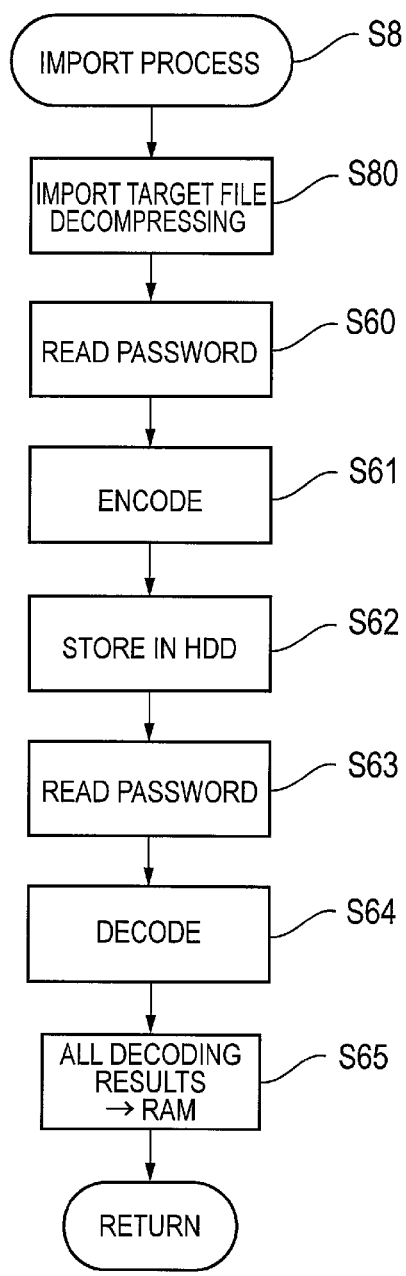

Next, a so-called import process will be described with reference to FIGS. 5C and 6C. The import process, which introduces a so-called intermediate file which is converted by a required conversion process from the folder or the like included in the other normal folders, is performed for the secure folder SQ which is displayed on the display 4 in the state exemplified in FIG. 3A. In FIGS. 5C and 6C, the same processes as the processes described in FIG. 2, 5A or 6A will be given the same step numbers, and thus, detailed description thereof will be omitted.

As shown in FIG. 5C, in the case that a manipulation for importing the intermediate file for the secure folder SQ which is displayed on the display 4 in the state exemplified in FIG. 3A is performed in the manipulation unit 6 (step S7), the processing unit 12 confirms whether the secure folder SQ at that time is in the close state or the open state (step S3).

As a result of the confirmation in step S3, if the secure folder SQ is in the open state (step S3; NO), the processing unit 12 performs the import process to be described later (step S8), and then, the process shown in FIG. 5C is terminated.

Meanwhile, as a result of the confirmation in step S3, if the secure folder SQ is in the close state (step S3; YES), the processing unit 12 performs the password authentication/decoding process based on the manipulation or the like in the manipulation unit 6 (step S100, see FIGS. 2 to 4), and then, the procedure goes to an operation in step S8.

Next, the import process in step S8 will be specifically described with reference to FIG. 6C.

Specifically, as shown in FIG. 6C, as the import process, the processing unit 12 firstly decompresses the compressed intermediate file which is a target of the import process, and then generates display data in the display apparatus D (step S80). Next, the encoder 10 and decoder 11 respectively perform processes of steps S60 to S65 shown in FIG. 6A for the corresponding data, to perform the import process as step S8, and then, the procedure goes to the process shown in FIG. 5C.

(V) Embodiment of Registering Process to Secure Folder

Figure 6D:
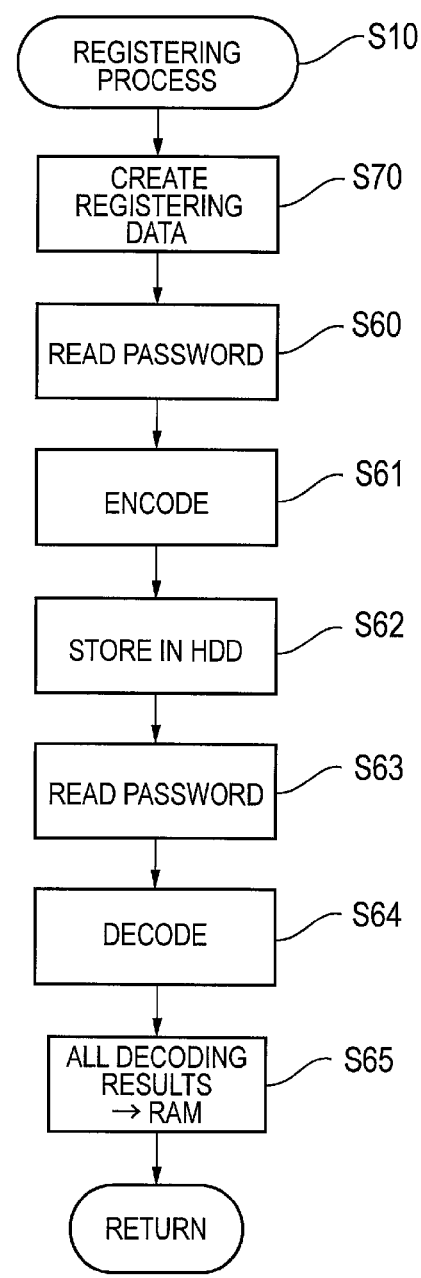

Next, the case that a registering process will be described with reference to FIGS. 5D and 6D. The registering process, which registers a folder or the like included in the other normal folders, is performed for the secure folder SQ which is displayed on the display 4 in the state shown in FIG. 3A. In FIGS. 5D and 6D, the same processes as the processes described in FIGS. 2, 5A and 6A will be given the same step numbers, and thus, detailed description thereof will be omitted.

The registering process to be described hereinafter is a process which is performed, for example, when a folder or the like including data to be displayed in the display apparatus D is registered in a lump in the personal computer P before outputting the folder or the like to the display apparatus D.

As shown in FIG. 5D, in the case where the manipulation for registering the folder or the like is performed in the manipulation unit 6 for the secure folder SQ which is displayed on the display 4 (step S9) in the state shown in FIG. 3A, the processing unit 12 confirms whether the secure folder SQ at that time is in the close state or the open state (step S3).

As a result of the confirmation in step S3, if the secure folder SQ is in the open state (step S3; NO), the processing unit 12 performs the registering process to be described later (step S10), and then, the process shown in FIG. 5D is terminated.

Meanwhile, as a result of the confirmation in step S3, if the secure folder SQ is in the close state (step S3; YES), the processing unit 12 performs the password authentication/decoding process based on the manipulation or the like in the manipulation unit 6 (step S100, see FIGS. 2 to 4), and then, the procedure goes to an operation in step S10.

Next, the registering process in step S10 will be specifically described with reference to FIG. 6D.

Specifically, as shown in FIG. 6D, as the registering process, the processing unit 12 firstly creates a folder or the like which is a target of the registering process (step S70). Next, the encoder 10 and the decoder 11 respectively perform the processes of steps S60 to S65 shown in FIG. 6A, for the created registering folder or the like, to perform the registering process as step S10, and then, the procedure goes to an operation shown in FIG. 5D.

As described above, according to the processes which are performed in the personal computer P for the secure folder SQ according to the embodiment, since the browsing in the secure folder SQ and the decoding process of the encoded folder or the like are allowed using the same password, the number of password input manipulations can be decreased, and thus, convenience in the process for the folder or the like can be improved.

Accordingly, for example, even in the case that the secure folder SQ is recorded in the hierarchical structure with a plurality of layers, the number of inputs of the password at the time of the encoding/decoding is reduced, and thus, user convenience for the encoding information in the secure folder SQ or the encoded folder or the like can be remarkably improved.

Further, only when the password is input to allow the browsing in the secure folder SQ, the encoded folder or the like is decoded in the state of being stored in the HDD 3 to generate the folder or the like for being provided to the process, and thus, the folder or the like can be provided for the process while confidentiality of the folder or the like can be maintained.

In addition, since all the encoded folders or the like, which are included in the secure folder SQ of which the browsing is allowed only when the password is input, are decoded in a lump using the corresponding password, and then, the folders or the like after the corresponding decoding are generated, passwords do not need to be input one by one when decoding of each folder or the like, thereby further improving convenience.

Furthermore, according to the pasting process to the secure folder according to the embodiment, the import process and the registering process, when a new folder or the like is pasted in the secure folder SQ, an encoded folder or the like obtained by encoding the corresponding folder or the like using the stored password is stored in the HDD 3, and further, the corresponding stored and encoded folder or the like is decoded and stored in the memory 2 and is provided to each process, even in the case that the new folder or the like is included in the secure folder SQ. Thus the encoding of the corresponding folder or the like and the storing in the memory 2 can be rapidly and simply performed.

In addition, in the pasting process to the other folder according to the embodiment, since when the folder or the like which belongs to the secure folder SQ is moved to any other normal folder group, the encoded folder or the like corresponding to the folder or the like which is a target of the corresponding movement is decoded using encoding information and stored in the memory 2, and further, the encoded folder or the like after the decoding is deleted from the HDD 3. Thus the folder or the like can be rapidly and simply decoded by using the stored password and moved to the other normal folder, and also the amount of information in the secure folder SQ can be reduced.

In the above described embodiments, when the secure folder SQ having a hierarchical structure of the plurality of layers is decoded, the case has been described where all the folders or the like in the secure folder SQ are decoded in a lump after the password is once input. However, alternatively, the once input password is stored in the memory 2, and then, the real decoding processes may be sequentially and automatically performed using the stored password every time a file or a folder which is a target of the corresponding decoding process is selected.

Further, programs corresponding to the flowcharts each shown in FIGS. 2, 5 and 6 or programs obtained through a network such as the Internet may be stored in a recording medium such as a flexible disk, an HD or the like, and then, may be read and executed by a computer such as a microcomputer, and thus, the computer can serve as the processing unit 12, the encoder 10 or the decoder 11 according to the embodiment.

As described hereinbefore, the invention can be applied to the field of information processing systems, and particularly, can be effectively applied to an information processing system which uses information which requires high confidentiality by means of encoding using a password.

What is claimed is:

1. An information processing apparatus comprising:
   an encoder configured to encode target information which is a target to be processed using encoding information so as to generate encoded target information;
   a first storage unit configured to store a target information group which includes the generated encoded target information;
   an input unit configured to receive an input of the encoding information;
   a processing control unit configured to allow browsing of attribute information indicating an attribute of the target information group only when the encoding information is input and an authentication process using the input encoding information is performed;
   a decoder configured to decode, after the browsing of the attribute information is allowed, the encoded target information contained in an encoded target information group of which the attribute information is allowed to be browsed, using the input encoding information, so as to generate the target information;
   a second storage unit configured to store the generated target information as the target information contained in the target information group; and
   a processing unit configured to process the target information stored in the second storage unit as the target,
   wherein the target information and the attribute information are encoded by the same encoding information, and
   wherein the decoder decodes at a time, only when the encoding information is input, all the encoded target information contained in the encoded target information group of which the browsing is allowed, using the input encoding information, so as to generate the target information corresponding to the encoded target information.

2. The information processing apparatus according to claim 1,
   wherein the second storage unit stores the input encoding information,
   wherein the encoder encodes, when new target information is contained in the target information group after the browsing of the attribute information is allowed, the newly contained target information using the encoding information so as to generate the encoded target information and to newly store the generated encoded target information in the first storage unit, and wherein the decoder decodes the encoded target information newly stored in the first storage unit using the encoding information, so as to store the encoded target information in the second storage unit so as to allow the processing unit to process the encoded target information.

3. The information processing apparatus according to claim 1, wherein the second storage unit stores the input encoding information, and wherein, when the target information corresponding to the encoded target information stored in the first storage unit is moved to other information group of which free browsing is allowed from the target information group containing the target information after the browsing of the attribute information is allowed, the decoder decodes the encoded target information corresponding to the target information which is a move target, using the stored encoding information, so as to store the decoded encoded target information in the second storage unit, wherein said information processing apparatus further comprising a deleting unit configured to delete the encoded target information corresponding to the target information which is the move target from the first storage unit.

4. The information processing apparatus according to claim 1, wherein when the encoded target information is decoded to generate the target information, the decoder generates the target information in a state in which the encoded target information is stored in the first storage unit.

5. A computer readable medium having an information processing program for an information processing apparatus comprising an input unit, a first storage unit and a second storage unit, said program being stored thereon, readable by a computer, and when executed by the computer, causing the computer to perform operations comprising:

encoding target information which is a target to be processed using encoding information so as to generate encoded target information;

storing a target information group containing the generated encoded target information in the first storage unit;

allowing browsing of attribute information indicating an attribute of the target information group only when the encoding information is input from the input unit and an authentication process using the input encoding information is performed;

decoding, after the browsing of the attribute information is allowed, the encoded target information contained in an encoded target information group of which the attribute information is allowed to be browsed, using the input encoding information, so as to generate the target information;

storing the generated target information as the target information contained in the target information group into the second storage unit; and processing the target information stored in the second storage unit as the target, wherein the target information and the attribute information are encoded by the same encoding information, and wherein the decoding decodes at a time, only when the encoding information is input, all the encoded target information contained in the encoded target information group of which the browsing is allowed, using the input encoding information, so as to generate the target information corresponding to the encoded target information.

* * * * *